July 30, 1940.　　　I. B. REMSEN　　　2,209,581
TRUCK
Filed Sept. 27, 1939
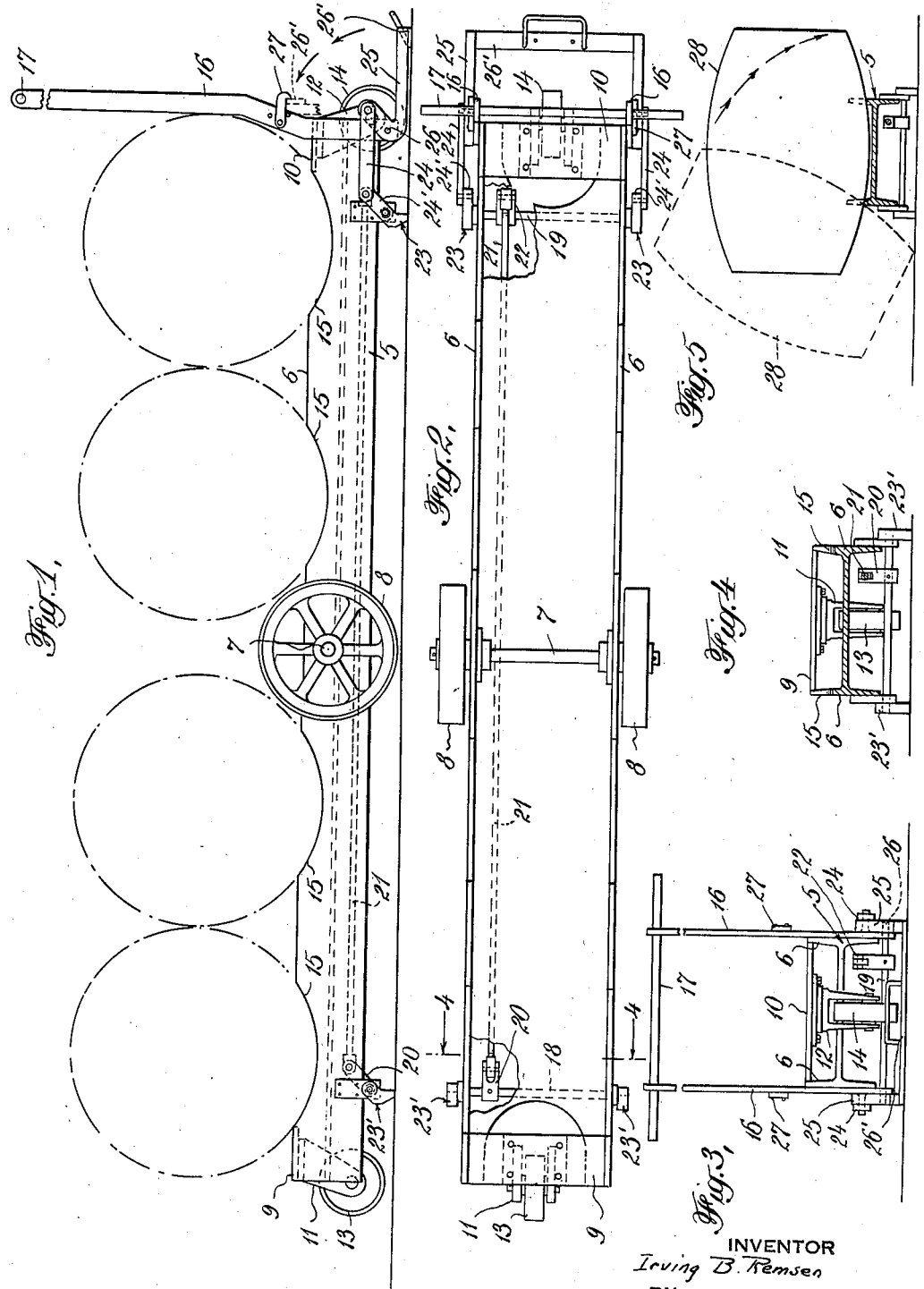
INVENTOR
Irving B. Remsen
BY
ATTORNEYS Patented July 30, 1940

2,209,581

UNITED STATES PATENT OFFICE 2,209,581

TRUCK

Irving B. Remsen, Trenton, N. J., assignor to Magnetic Pigment Company, New York, N. Y., a corporation of New York Application September 27, 1939, Serial No. 296,731

2 Claims. (Cl. 280—50)

This invention relates to trucks adapted to facilitate the handling of heavy containers such as barrels, boxes and crates.

Trucks commonly used in factories and elsewhere to transport barrels and other containers are usually of the two-wheel vertical type and of limited capacity. Where distances are considerable, as they frequently are in industrial plants, the labor cost in handling containers is frequently excessive when trucks of the ordinary type are used. Four-wheeled platform trucks are also in use, but as commonly constructed such trucks require lifting of the containers, which is not always practicable and in any event requires a large expenditure of heavy labor.

It is the object of the present invention to provide a truck capable of receiving a plurality of containers and permitting relatively easy transportation, the truck being so constructed as to facilitate the loading and unloading of the containers and particularly to afford maximum safety in handling.

Another object of the invention is the provision of means in the truck to prevent rolling during the loading and unloading operations, such means being simple and effective and easily operated.

Another object of the invention is the provision of a truck which may be readily and quickly loaded and unloaded, and is easily moved from place to place and in any direction.

Other objects and advantages of the invention will be better understood by reference to the following specification and accompanying drawing, in which Fig. 1 is a side elevation of the truck;

Fig. 2 is a plan view thereof;

Fig. 3 is an end elevation of the truck;

Fig. 4 is a section on the line 4—4 of Fig. 2; and

Fig. 5 is a view partially in section illustrating the procedure in loading and unloading the truck.

Referring to the drawing, the platform of the truck may be of any suitable construction sufficiently strong to receive and support a considerable load, for example 2000 pounds or less. Of course, heavier trucks may be constructed, but I have found that 2000 pounds is approximately the maximum that one man can handle efficiently. Conveniently, the platform of the truck consists of an I-beam 5 with its flanges 6 vertically disposed. Medially of the length of the platform, an axle 7 is provided, and wheels 8 are journaled on the axle. At opposite ends of the platform, plates 9 and 10 are secured to the flanges 6, and brackets 11 and 12, bolted or otherwise fastened to the plates, are adapted to support wheels 13 and 14.

As indicated in Fig. 1, the diameters of the wheels 13 and 14 are such that when the wheels 8 rest upon a support such as a floor, only one of the wheels 13 and 14 will engage the floor. Hence when the truck rolls, the weight is carried by a three-wheeled support, which facilitates direction and handling of the truck. The engagement of wheels 13 or 14 with the floor will depend upon the distribution of weight on the truck. Conveniently, particularly if barrels or drums are to be handled, the upper flanges 6 of the platform may be cut away, as indicated at 15, forming cradles which prevent rolling of the barrels or other cylindrical containers on the truck.

At one end of the truck, upright members 16 are secured to the flanges 6 and are connected by a bar 17 affording an operating handle whereby traction force may be exerted to move the truck either forwardly or backwardly, as desired. Any other suitable means for applying traction force to the truck may be provided.

In order that the truck may be held stationary during loading and unloading operations, thereby preventing accidents, and facilitating the handling of the containers, I provide cams 23 and 23' secured to shafts 18 and 19 which are rotatably mounted in the lower flanges 6 of the platform. A lever 20 is secured to the shaft 18 and is connected by a link 21 to a lever 22 on the shaft 19, so that all of the cams may be actuated in unison. A lever 24' secured to the shaft 19 is connected by a link 24 to a bell crank lever 25 which is pivoted at 26 on one of the lower flanges 6 of the platform. When the bell crank lever is moved to the position indicated in Fig. 1, the cams 23 and 23' are rotated, and engage the floor or surface on which the truck is disposed, lifting all of the wheels from the surface. The platform is then supported on the floor through the cams, and is held stationary during the loading or unloading operation. When it is desired to release the truck, the lever 25 is lifted by means of a handle 26' to engage a latch 27 pivoted on one of the upright members 16. As the cams 23 and 23' are rotated by movement of the lever 25, the wheels 8 of the truck and one of the wheels 13 and 14, comes into engagement with the floor or surface, and the truck may be rolled by the application of traction force. When the truck is again to be loaded or unloaded, the lever 25 is again moved to the position indicated in Fig. 1, so that the platform is supported on the cams and is stationary.

The manner of loading and unloading the truck is indicated in Fig. 5. The barrel or other container 28 is first moved to the position indicated in dotted lines adjacent the side of the truck. By simply rocking the barrel in the direction indicated by the arrows, it will fall into the position indicated in full lines. In unloading, the operation is simply reversed. No lifting of the entire weight of the container is necessary, and it has been found that barrels, drums and heavy boxes and crates can be handled in the manner indicated with very slight expenditure of effort and little, if any, risk such as is incident in ordinary methods of handling heavy merchandise of this character.

Various changes may be made in the details of construction and arrangement of the parts and mechanism, without departing from the invention or sacrificing the advantages thereof.

I claim:

1. A truck for receiving and transporting relatively heavy articles comprising a frame having a horizontal portion and generally vertically extending flanges at the sides thereof, said side flanges being cut away at intervals for receiving articles, an axle extending through each side flange and being positioned close to said horizontal frame portion, wheels mounted on said axle, the radius of said wheels being only slightly greater than the vertical distance from said axle to the bottom of the frame, whereby the frame will be in relatively close proximity to a supporting surface for the truck and the truck may be loaded by pushing articles standing on end from the supporting surface over onto said frame, means at one end of the frame through which a force to move said truck may be applied, and means manually operable from said end of the frame to raise the plane of the frame and to hold it stationary, the width of said frame between the outer edges of said side flanges being approximately twice the vertical distance from the plane of the lower portion of said cut away portions of the side flanges to the plane of the bottom of the wheels so that articles having a length substantially twice the width of the frame when thus loaded onto said frame will be substantially centered thereon longitudinally of the articles.

2. A truck for receiving and transporting relatively heavy articles comprising a frame, the main body of said frame being an I-beam with the flanges thereof forming the sides of the frame, said sides of the I-beam being cut away at intervals for receiving articles, an axle extending above the web of said I-beam and through each side flange thereof, wheels mounted on said axle, the radius of said wheels being only slightly greater than the vertical distance from said axle to the bottom of the vertical flanges, whereby the frame will be in relatively close proximity to a supporting surface for the truck and the truck may be loaded by pushing articles standing on end on the supporting surface over onto said frame.

IRVING B. REMSEN.